United States Patent
Oonaru (10) Patent No.: US 9,949,207 B2
(45) Date of Patent: Apr. 17, 2018

(54) COMMUNICATION TERMINAL AND COMMUNICATION CONTROL METHOD

(71) Applicant: KYOCERA Corporation, Fushimi-ku, Kyoto-shi, Kyoto (JP)

(72) Inventor: Shinichi Oonaru, Osaka (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/388,788

(22) PCT Filed: Mar. 27, 2013

(86) PCT No.: PCT/JP2013/058924
§ 371 (c)(1),
(2) Date: Sep. 26, 2014

(87) PCT Pub. No.: WO2013/146848
PCT Pub. Date: Oct. 3, 2013

(65) Prior Publication Data
US 2015/0045010 A1 Feb. 12, 2015

(30) Foreign Application Priority Data
Mar. 28, 2012 (JP) .............................. 2012-072791

(51) Int. Cl.
*H04M 3/00* (2006.01)
*H04W 52/02* (2009.01)
(Continued)

(52) U.S. Cl.
CPC ... *H04W 52/0229* (2013.01); *H04M 1/72569* (2013.01); *H04W 52/0254* (2013.01); *H04W 88/02* (2013.01); *Y02B 60/50* (2013.01)

(58) Field of Classification Search
CPC ............. H04W 52/0229; H04W 88/02; H04W 52/0235; H04M 1/2569; G06F 1/3231; G06F 1/3228; G06F 1/3265; G09G 3/3406
(Continued)

(56) References Cited

U.S. PATENT DOCUMENTS

2002/0172178 A1 11/2002 Suzuki et al.
2003/0148800 A1* 8/2003 Lee ..................... H04B 1/1615
455/574
(Continued)

FOREIGN PATENT DOCUMENTS

JP 2003-037874 A 2/2003
JP 2004-128574 A 4/2004
(Continued)

OTHER PUBLICATIONS

International Search Report dated Jun. 4, 2013, issued for International Application No. PCT/JP2013/058924.
(Continued)

*Primary Examiner* — Kwasi Karikari
(74) *Attorney, Agent, or Firm* — Procopio Cory Hargreaves and Savitch LLP (57) ABSTRACT

A mobile phone 10 comprises a display 14, and establishes wireless communication of a dormant system with a base station (100). In a case where a first function (62) or the like is performed by a user operation, when a communication period of the wireless communication is ended, a communication state is transited to a dormant state after an active state is maintained. In contrast, in a case where the display 14 is made in a screen-off due to no user operation, when the communication period of the wireless communication is ended, a communication state is transited to a dormant state while the active state is not maintained.

10 Claims, 6 Drawing Sheets

(51) Int. Cl.
*H04M 1/725* (2006.01)
*H04W 88/02* (2009.01)

(58) Field of Classification Search
USPC ....... 455/11.1, 418, 445, 509, 518, 519, 574
See application file for complete search history.

(56) References Cited

U.S. PATENT DOCUMENTS

| | | | |
|---|---|---|---|
| 2005/0044241 A1* | 2/2005 | Dunstan | G06F 1/3203 709/228 |
| 2005/0192046 A1* | 9/2005 | Harris | H04W 8/22 455/552.1 |
| 2009/0121655 A1* | 5/2009 | Kojima | G09G 3/3406 315/307 |
| 2009/0312029 A1* | 12/2009 | Ananthanarayanan | H04M 1/72519 455/450 |
| 2011/0207465 A1* | 8/2011 | Dwyer | H04W 76/046 455/450 |
| 2011/0222451 A1* | 9/2011 | Peisa | H04W 52/0225 370/311 |
| 2012/0094722 A1* | 4/2012 | Kim | H04W 52/0251 455/566 |
| 2012/0120799 A1* | 5/2012 | Brisebois | H04W 4/001 370/231 |
| 2012/0281561 A1* | 11/2012 | Shukla | H04W 76/068 370/252 |

FOREIGN PATENT DOCUMENTS

| | | |
|---|---|---|
| JP | 2008-301106 A | 12/2008 |
| JP | 2009-267882 A | 11/2009 |
| JP | 2010-118834 A | 5/2010 |
| JP | 2010-523014 A | 7/2010 |
| JP | 2010-278689 A | 12/2010 |
| JP | 2010-288278 A | 12/2010 |
| JP | 2011-101231 A | 5/2011 |
| JP | 2011-244280 A | 12/2011 |
| WO | 2008-108696 A1 | 9/2008 |

OTHER PUBLICATIONS

Office Action dated Nov. 22, 2016 by the Japanese Patent Office for counterpart Japanese patent Application No. 2016-019397.

* cited by examiner

COMMUNICATION TERMINAL AND COMMUNICATION CONTROL METHOD

FIELD OF ART

The present invention relates to a communication terminal and a communication control method, and more specifically, a communication terminal and a communication control method, performing a wireless communication.

BACKGROUND ART

Technologies concerning background reception in mobile phones are known. The background reception means that in a case where a mobile phone receives data, even if some processing is performed, the mobile phone receives the data in the background, whereby the processing being currently performed is not disturbed.

SUMMARY OF THE INVENTION

Problems to be Solved by the Invention

However, in the mobile phone that is called a smartphone, the background communication (reception) for periodical server synchronization by each application (function) occurs frequently. Therefore, there is possibility that current consumption increases.

Therefore, it is a primary object of the present invention to provide a novel communication terminal and communication control method.

It is another object of the present invention to provide a communication terminal and communication control method, capable of reducing current consumption of wireless communication.

Means for Solving the Problems

A first aspect of the present invention is a communication terminal comprising a communication circuit that performs wireless communication according to a system that the wireless communication is made dormancy temporarily, and an active state can be held after the wireless communication, comprising: a detecting module operable to detect a predetermined state; and a shortening module operable to shorten a time period of the active state when the predetermined state is detected.

A second aspect of the present invention is a communication control method in a communication terminal comprising a communication circuit that performs wireless communication according to a system that the wireless communication is made dormancy temporarily, and an active state can be held after the wireless communication, comprising steps of: detecting a predetermined state; and shortening a time period of the active state when the predetermined state is detected.

Advantages of the Invention

According to the present invention, current consumption of wireless communication can be reduced.

The above described objects and other objects, features, aspects and advantages of the present invention will become more apparent from the following detailed description of the present invention when taken in conjunction with the accompanying drawings.

FORMS FOR EMBODYING THE INVENTION

Figure 1:
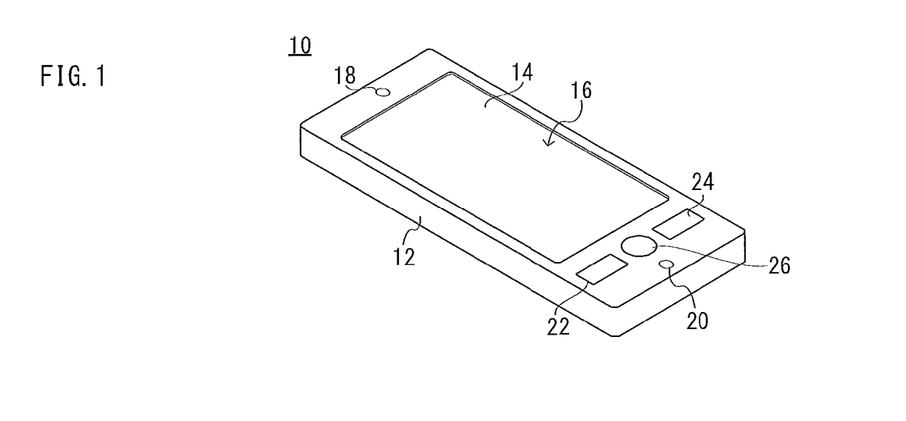
FIG. 1 is an appearance view showing a mobile phone of an embodiment according to the present invention.

With referring to FIG. 1, a mobile phone 10 of an embodiment according to the present invention is a smartphone as an example, and includes a longitudinal flat rectangular housing 12. However, it is pointed out in advance that the present invention can be applied to an arbitrary mobile terminal such as a tablet terminal, a PDA, etc.

A display 14 that functions as a displaying module of a liquid crystal, organic EL or the like is provided on a main surface (front surface) of the housing 12. A touch panel 16 is provided on the display 14. Therefore, in the mobile phone 10 of this embodiment, the most part of an input operation excepting an input by an operation of hardware keys described later is performed through the touch panel 16.

A speaker 18 is housed in the housing 12 at one end of a longitudinal direction on a side of the front surface, and a microphone 20 is housed at the other end in the longitudinal direction on the side of the front surface. As hardware keys constituting an input operating module together with the touch panel 16, a call key 22, an end key 24 and a menu key 26 are provided, in this embodiment.

For example, the user can input a telephone number by performing a touch operation by the touch panel 16 to a dial key (not shown) displayed on the display 14, and start a telephone conversation by operating the call key 22*a*. If the end key 22*b* is operated, the telephone conversation can be ended. In addition, by long-depressing the end key 24, it is possible to turn on/off a power supply of the mobile phone 10.

If the menu key 26 is operated, a menu screen is displayed on the display 14, and in such a state, by performing a touch operation by the touch panel 16 to software keys, menu icons or the like (both not shown) being displayed on the display 14, it is possible to select a menu and to determine such a selection.

Figure 2:
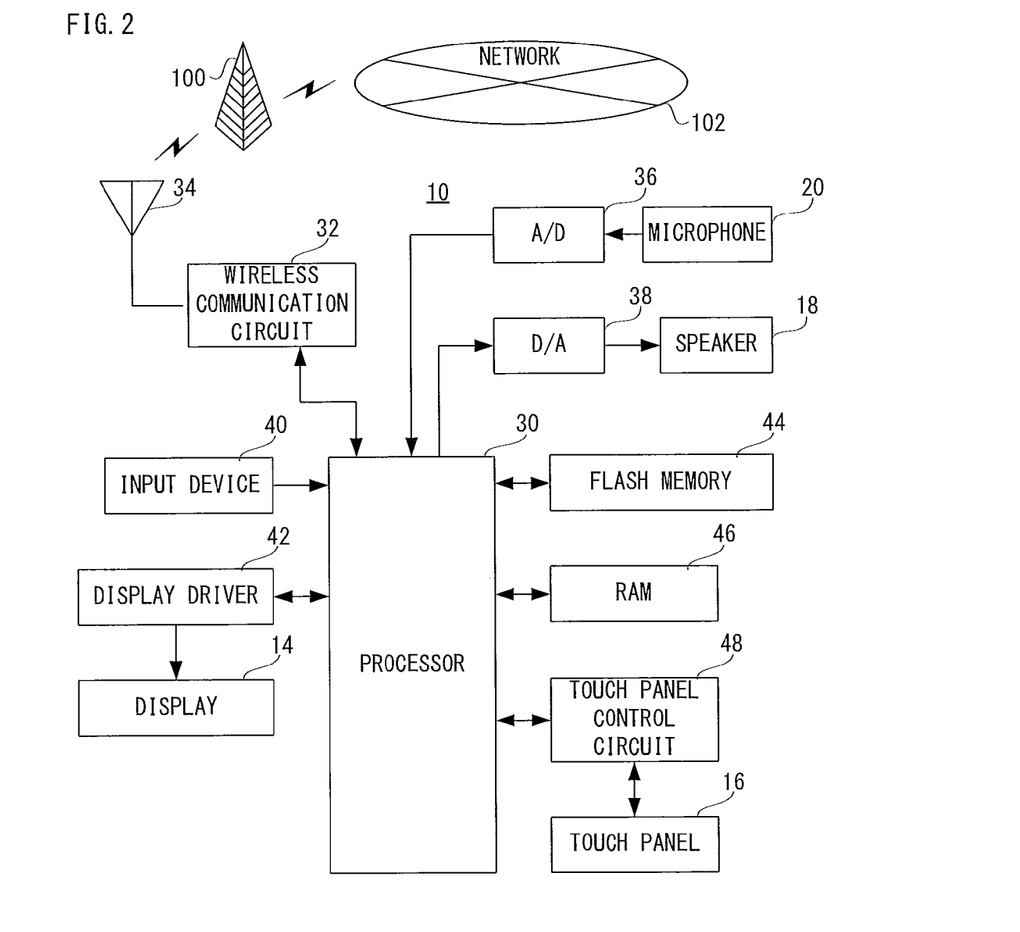
FIG. 2 is an illustrative view showing electric structure of the mobile phone shown in FIG. 1.

With referring to FIG. 2, the mobile phone 10 of the embodiment shown in FIG. 1 includes a processor 30 that is called a computer or CPU. The processor 30 is connected with a wireless communication circuit 32, an A/D converter 36, a D/A converter 38, an input device 40, a display driver 42, a flash memory 44, a RAM 46, a touch panel control circuit 48, etc. Furthermore, the wireless communication circuit 32 is wirelessly connected to a base station 100 via an antenna 34. Then, the base station 100 is connected to a network (communication network, telephone network) 102 wirelessly or via a cable or wire.

The processor 30 is in charge of a whole control of the mobile phone 10. A whole or a part of a program set in advance in the flash memory 44 is, in use, developed or loaded into the RAM 46, and the processor 30 operates in accordance with the program developed in the RAM 46. In addition, the RAM 46 is further used as a working area or buffer area for the processor 30.

The input device 40 includes the touch panel 16 and the hardware keys 22-26 shown in FIG. 1, and constitutes an operating module or inputting module. Information (key data) of the hardware key that the user operated is input to the processor 30.

The wireless communication circuit 32 is a circuit for transmitting and receiving a radio wave for a telephone conversation, an email, etc. with the base station 100. The wireless communication circuit 32 is a circuit for performing wireless communication of a dormant system. The wireless communication of the dormant system is a kind of data communication system, and a system that the wireless communication is temporarily suspended (dormant) if there is no communication for a predetermined time period between the mobile phone 10 and the base station 100, or if a radio wave state is bad.

For example, if the user instructs an outgoing call (telephone call) using the input device 40, the wireless communication circuit 32 performs telephone call processing under instructions from the processor 30 and outputs a telephone call signal via the antenna 34. The telephone call signal is transmitted to a telephone at the other end of the line through the base station 100 and the network 102. Then, when incoming call processing is performed in the telephone at the other end of the line, a communication-capable state is established and the processor 30 performs telephone conversation processing.

Specifically describing normal telephone conversation processing, a modulated voice signal sent from a telephone at the other end of the line is received by the antenna 34. The modulated voice signal received is subjected to demodulation processing and decode processing by the wireless communication circuit 32. A received voice signal obtained through such processing is converted into a voice signal by the D/A converter 38 to be output from the speaker 18. On the other hand, a sending voice signal taken-in through the microphone 20 is converted into voice data by the A/D converter 36 to be applied to the processor 30. The voice data is subjected to encode processing and modulation processing by the wireless communication circuit 32 under instructions of the processor 30 to be output via the antenna 34. Therefore, the modulated voice signal is transmitted to the telephone at the other end of the line via the base station 100 and the network 102.

When the telephone call signal from a telephone at the other end of the line is received by the antenna 34, the wireless communication circuit 32 notifies the processor 30 of the incoming call. In response thereto, the processor 30 displays on the display 14 sender information (telephone number and so on) described in the incoming call notification by controlling the display driver 42. In addition, according to the above-described processing, the processor 30 outputs from the speaker 18 a ringtone (may be also called as a ringtone melody, a ringtone voice).

Then, if the user performs an answering operation by using the call key 22 (FIG. 1) included in the input device 40, the wireless communication circuit 32 performs processing for establishing a communication-capable state under instructions of the processor 30. Furthermore, when the communication-capable state is established, the processor 30 performs the above-described telephone conversation processing.

If the telephone conversation ending operation is performed by the end key 24 (FIG. 1) included in the input device 40 after a state is changed to the communication-capable state, the processor 30 transmits a telephone conversation ending signal to the telephone at the other end of the line by controlling the wireless communication circuit 32. Then, after transmission of the telephone conversation ending signal, the processor 30 terminates the telephone conversation processing. Furthermore, in a case where the telephone conversation ending signal from the telephone at the other end of the line is received, the processor 30 also terminates the telephone conversation processing. In addition, in a case that the telephone conversation ending signal is received from the mobile communication network not from the telephone at the other end of the line, the processor 30 also terminates the telephone conversation processing.

The microphone 20 shown in FIG. 1 is connected to the A/D converter 36, and as described above, a voice signal from the microphone 20 is input to the processor 30 as digital voice data through the A/D converter 36. The speaker 18 is connected to the D/A converter 38. The D/A converter 38 converts digital voice data into a voice signal so as to apply to the speaker 18 via an amplifier. Therefore, a voice of the voice data is output from the speaker 18.

In addition, the processor 30 adjusts, in response to an operation for adjusting a volume by the user, a voice volume of the voice output from the speaker 18 by controlling an amplification factor of the amplifier connected to the D/A converter 38.

The display driver 42 is connected to the display 14 and the processor 30, and stores image data that is output from the processor 30 to a VRAM. Then, the display driver 42 displays on the display 14 the images corresponding to image data in the VRAM. That is, the display driver 42 controls displaying by the display 14 that is connected to the display driver 42 under instructions of the processor 30. In addition, the display 14 is provided with a backlight which includes a light source of an LED or the like, for example, and the display driver 42 controls, according to the instructions of the processor 30, brightness, lighting on/off of the backlight.

The touch panel 16 shown in FIG. 1 is connected to a touch panel control circuit 48. The touch panel control circuit 48 applies to the touch panel 16 a necessary voltage or the like and inputs to the processor 30 a touch start signal indicating a start of a touch by the user to the touch panel 16, a touch end signal indicating an end of a touch by the user, and coordinates data indicating a touch position that the user touches. Therefore, the processor 30 can determine which icon or key is touched by the user based on the coordinates data.

In the embodiment, the touch panel 16 is of an electrostatic capacitance system that detects a change of an electrostatic capacitance between electrodes, which occurs when an object such as a finger is in close to a surface of the touch panel 16, and it is detected that one or more fingers are brought into contact with the touch panel 16, for example. Furthermore, the touch panel 16 is provided on the display 14, and serves as a pointing device for designating an arbitrary position within the screen. The touch panel control circuit 48 detects a touch operation within a touch-effective range of the touch panel 16, and outputs coordinates data indicative of a position of the touch operation to the processor 30. That is, the user inputs to the mobile phone 10 an operation position, an operation direction and so on through a touch, slide or release operation or through a combination of these operations on the surface of the touch panel 16.

In addition, for a detection system of the touch panel 16, a surface-type electrostatic capacitance system may be adopted, or a resistance film system, an ultrasonic system, an infrared ray system, an electromagnetic induction system or the like may be adopted. Furthermore, a touch operation is not limited to an operation by a finger, may be performed by a stylus or the like.

Figure 3:
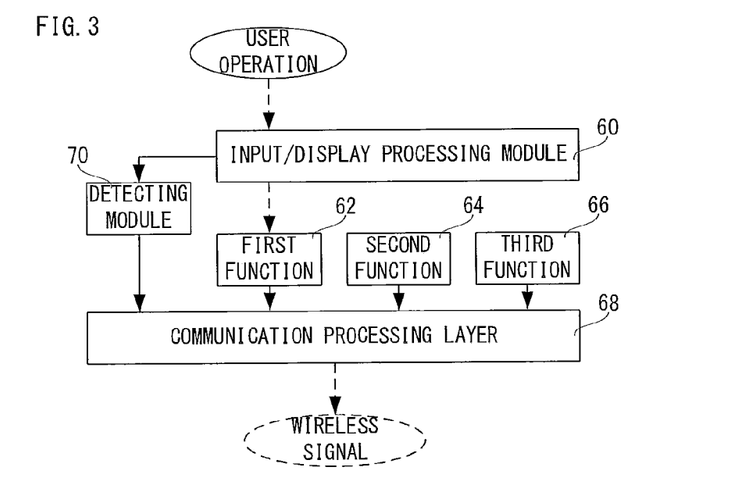
FIG. 3 is an illustrative view showing an example of structure of functional blocks of the mobile phone shown in view 1.

FIG. 3 is an illustrative view showing structure of functional blocks of the mobile phone 10 that performs communication. In the structure shown in FIG. 3, an input/display processing module 60, a first function 62, a second function 64 and a third function 66, a communication processing layer 68 and a detecting module 70 are included.

The input/display processing module 60 includes the display 14, the touch panel 16, the hardware keys 22-26, the processor 30, the display driver 42, the touch panel control circuit 48, etc. For example, the input/display processing module 60 notifies a touch operation or a key operation that is performed based on a GUI being displayed on the display 14 to each of the functions 62-66 that is being performed. In addition, input/display processing part 60 manages, according to the touch operation or the key operation, what kind of displaying is to be performed on the display 14.

The first function 62, the second function 64 and the third function 66 are performed by the processor 30 in parallel with each other. In addition, the respective functions 62-66 are instructed to perform according to a user operation, or automatically instructed in the background. For example, the first function 62 includes a browser function for perusing HP (Websites), etc. and a mail function performing reception of emails, and the second function 64 and the third function 66 include an SNS function, etc. for using a short blog, etc. In addition, in other embodiments, much more functions may be performed in parallel.

The communication processing layer 68 includes the processor 30, the wireless communication circuit 32 and the antenna 34. The communication processing layer 68 changes a communication request from each of the functions 62-66 into a radio wave signal, and transmits and receives the radio wave signal with the base station 100. At this time, the communication processing layer 68 determines a communication destination based on an IP address included in the communication request.

In addition, the wireless communication that is performed by the communication processing layer 68 includes the wireless communication by the user operation, and the background communication not by the user operation. For example, the former wireless communication is performed when a browser function (the first function 62) transmits and receives a lot of data with a server. Furthermore, the latter wireless communication is performed when an SNS function (the second function 64 or the third function 66) synchronizes with a server by the background communication. In addition, since the higher-ranking functions 62-66 are carried out by the parallel processing, the communication processing layer 68 cannot distinguish the communication by which function.

The detecting module 70 includes the processor 30. In addition, the detecting module 70 detects a state that the user operation is not performed, and may shorten the time period of the active state described later according to a detection result.

Figure 4:
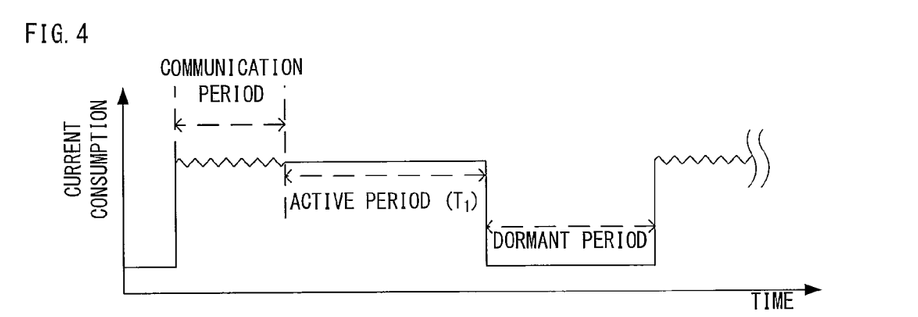
FIG. 4 is an illustrative view showing an example of a graph indicating a relationship between current consumption and a time at a time that the mobile phone shown in FIG. 1 is performing wireless communication.

FIG. 4 is an illustrative view of a graph indicating a relationship between current consumption of the mobile phone 10 and a time in a state that the wireless communication is being performed. With reference to FIG. 4, if the mobile phone 10 establishes the wireless communication (connection) with the base station 100, the current consumption becomes large, and the current consumption becomes small if the wireless communication is disconnected. A period that the mobile phone 10 and the base station 100 are performing the data communication is called a "communication period." If the communication period is ended, an active state that the wireless connection between the mobile phone 10 and the base station 100 is maintained is held. In addition, a time period that the active state is held is called an "active period." Then, if "$T_1$" seconds (10 seconds, for example) lapse after the communication period is ended, a transition instruction to a dormant state is issued from the base station 100. That is, after the communication period is ended, the active period is held for "$T_1$" seconds. Furthermore, if the processor 30 receives the transition instruction to a dormant state, the communication state is transited to the dormant state, and the wireless communication between the mobile phone 10 and the base station 100 is disconnected while the processor 30 goes to a sleep state. Then, a period until that next wireless communication is established after transition to the dormant state is called a "dormant period."

In addition, even if there is no transition instruction to a dormant state issued from the base station 100, a timer is set so as to transit to the dormant state at a timing that the time period of the active state reaches "$T_0$ seconds" (20 seconds, for example). Hereinafter, the timer corresponding to the time period of the active state is called an "active timer."

In the active state, the processor 30 is in a state of "Wake Up", and connection of the wireless communication with the base station 100 is maintained. Therefore, even if there is a next communication request by the function that is being currently performed, it is possible to resume the data communication immediately. In contrast, in the dormant state, the processor 30 is in a state of "Sleep", and communication with the base station 100 is disconnected. In this case, since the mobile phone 10 needs to re-connect with the base station 100 in order to resume the wireless communication, there occurs a time lag of a predetermined time period (2 to 3 seconds, for example) until the data communication is re-started.

Figure 5:
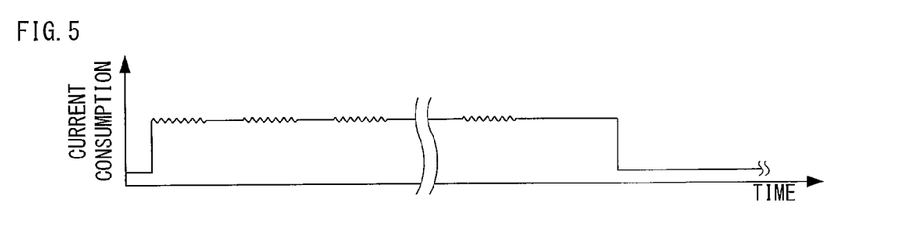
FIG. 5 is an illustrative view showing another example of a graph indicating a relationship between current consumption and a time at a time that the mobile phone shown in FIG. 1 is performing wireless communication.

FIG. 5 shows a graph indicating a relationship between current consumption and a time at a time that the wireless communication is being performed by the first function 62. The first function 62 is a browser function as mentioned above, and is performed by the user operation. If the first function 62 issues a communication request to the communication processing layer 68 according to the user operation, the wireless communication of the mobile phone 10 with the base station 100 is established. Then, the data communication is performed in the communication period, and the active state is held after the data communication finishes. For example, if the data communication that transmits and receives a lot of data is performed intermittently, when the active state is held, subsequent data communication can be performed repeatedly. Thus, if the active state is held, since there is no return from the dormant state, a response of the wireless communication becomes quick. That is, it is considered that by holding the active state, the physical feeling of the transmission speed in the user operation is not spoiled.

Figure 6:
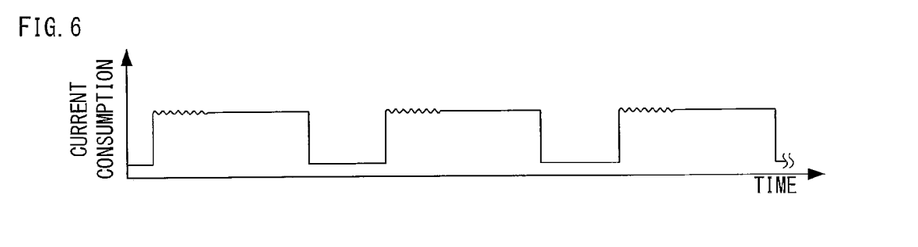
FIG. 6 is an illustrative view showing a further example of a graph indicating a relationship between current consumption and a time at a time that the mobile phone shown in FIG. 1 is performing wireless communication.

FIG. 6 is an illustrative view of a graph indicating a relationship between current consumption and a time at a time that the communication is being performed by the second function 64, the third function 66 or the like that is performed in the background. Since there is little data to be transmitted and received in these functions, the communication period is short. However, the active state is held at every time that the wireless communication is established. Therefore, even in a state that there is no user operation, the active state is held, and accordingly, the current consumption is wasted.

Here, in a case where the active state is made not to be held for reduction of the current consumption, whenever data communication is performed, it is necessary to return to the active state from the dormant state, and a response of the wireless communication becomes slow. That is, if the active state is not held, the physical feeling of the transmission speed in the user operation becomes to be spoiled.

Then, in this embodiment, when the user is not using the mobile phone 10, the time that the active state is held is shortened, thereby to transit to the dormant period earlier than usual. Accordingly, it is possible to reduce the current consumption without spoiling the physical feeling of the transmission speed in the user operation.

Figure 7:
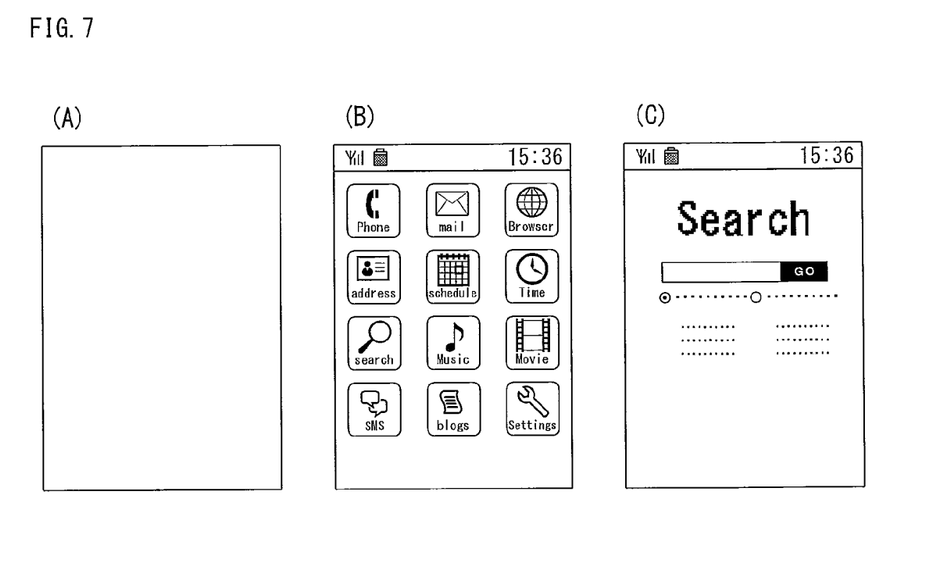
FIG. 7 is an illustrative view showing examples of a displaying state of a display shown in FIG. 1, wherein FIG. 7 (A) shows a state of screen-off, FIG. 7 (B) shows a state that a stand-by screen is displayed and FIG. 7 (C) shows a state that a functional screen is displayed.

FIG. 7 (A) is an illustrative view showing the display 14 made to be in the screen-off, FIG. 7 (B) is an illustrative view showing an example of the stand-by screen, and FIG. 7 (C) is an illustrative view showing an example of the functional screen that is displayed when an arbitrary function is performed. At the input/display processing module 60 notifies the displaying contents of the display to the detecting module 70 at every changing of the screens.

More specifically, if the display becomes the state of the screen-off, the display driver 42 notifies the state of the screen-off to the processor 30. If the stand-by screen is displayed on the display 14, the OS of the mobile phone 10 outputs a message indicating that the stand-by screen is being displayed. In addition, if the message is output, the contents are stored in the buffer of the RAM 46. In addition, if the first function 62 is performed, the OS of the mobile phone 10 outputs a message indicating the contents of the functional screen according to the function that is currently performed.

The detecting module 70 detects a state that the mobile phone 10 is not operated by the user when the screen-off that the user operation is not performed or the stand-by state that no communication by the user operation occurs is notified from the input/display processing module 60. Then, if the state that the mobile phone 10 is not operated by the user is detected, the detecting module 70 shortens (changes) the time period of the active state.

Figure 8:
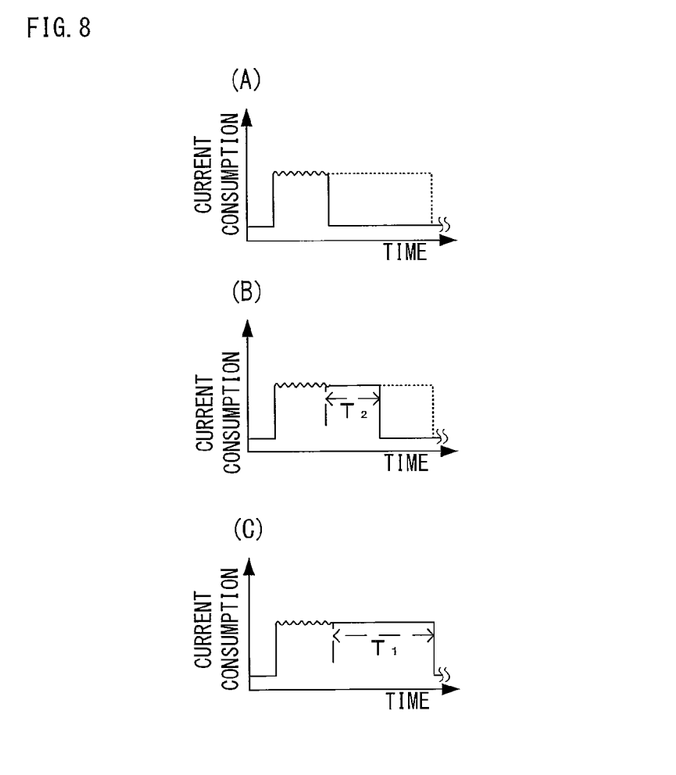
FIG. 8 is an illustrative view a still further example of a graph indicating a relationship between current consumption and a time at a time that the mobile phone shown in FIG. 1 is performing wireless communication, wherein FIG. 8 (A) shows the graph indicating a relationship between current consumption and a time at a time that an active state is not held, FIG. 8 (B) shows a graph indicating a relationship between current consumption and a time at a time that the active period is shortened and FIG. 8 (C) shows a graph indicating a relationship between current consumption and a time at a time that the active state is held usually.

With reference to FIG. 8 (A), in a case where the data communication is performed at a time of the screen-off, a time period that the aforementioned active timer expires is set as "0 second ($T_3$ seconds: a first time period)." Therefore, the active period is no longer held after the communication period. Hereinafter, a matter that the active state is not held to be immediately transited to the dormant state is called a "fast dormant." Furthermore, an instruction for setting a time period that the active timer expires to "$T_3$ seconds" for the fast dormant is called a "forcing fast dormant instruction."

Next, with reference to FIG. 8 (B), in a case where the data communication is performed at a time that the stand-by screen is displayed, a time period of the active state that is held after the communication period is shortened at "$T_2$ seconds (5 seconds, for example: a second time)" shorter than the usual "$T_1$ seconds." Specifically, a time period that the active timer expires is set as "$T_2$ seconds."

Then, with reference to FIG. 8 (C), in a case where the data communication is performed when the functional screen by means of the first function 62 or the like is displayed, a time period of the active state that is held after the communication period becomes "$T_1$ seconds" as usual. However, a time period that the active timer expires is set at "$T_0$ seconds" as described above.

Thus, in a case where the wireless communication is performed when the mobile phone 10 is not operated, by shortening the time period of the active state, it is possible to reduce the current consumption without spoiling the physical feeling of the transmission speed in the user operation.

In particular, when the display 14 is in the screen-off, it is possible to reduce the current consumption by making the active state not to be held. In addition, even when the display 14 is not in the screen-off but the stand-by screen is displayed, and the active period is shortened so that the current consumption can be suppressed.

Figure 9:
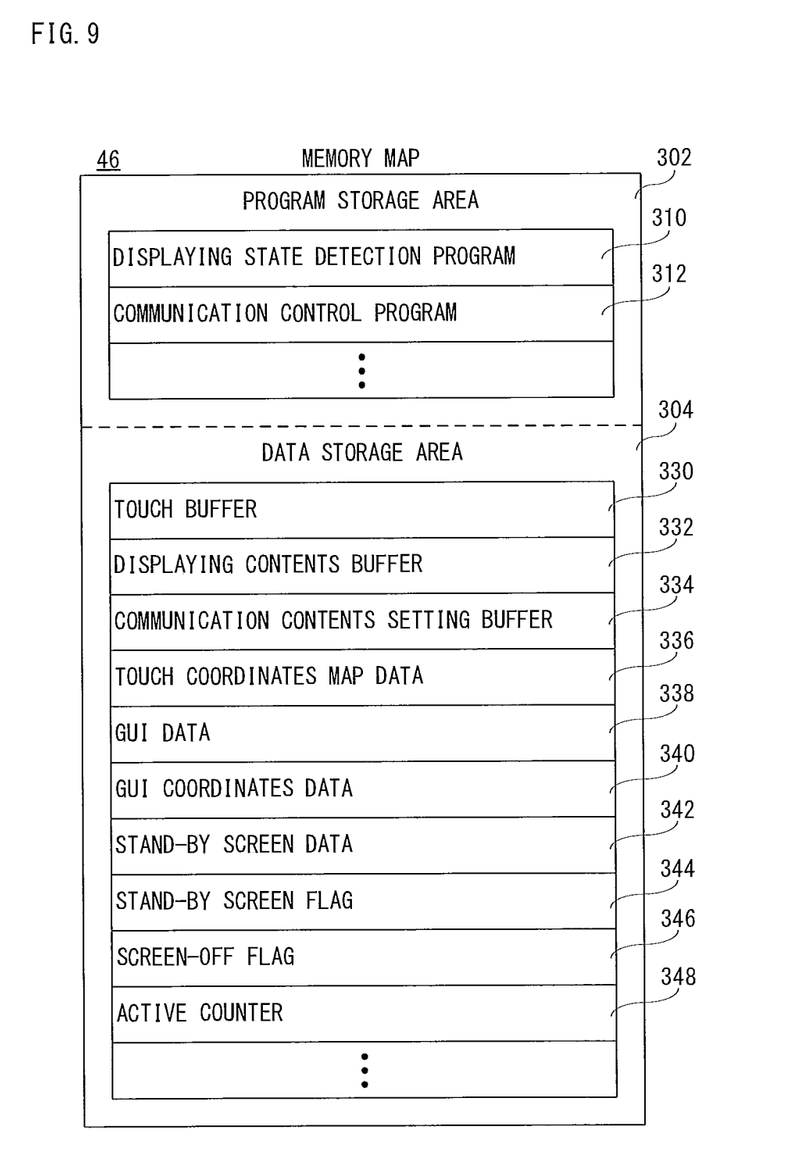
FIG. 9 is an illustrative view showing an example of a memory map of a RAM shown in FIG. 2.

In the above, the features of the embodiment are outlined, and in the following, the embodiment will be described in detail using a memory map of the RAM 46 of the mobile phone 10 as shown in FIG. 9 and flowcharts to be executed by the processor 30 of the mobile phone 10 shown in FIG. 10 and FIG. 11.

With referring FIG. 9, the RAM 46 shown in FIG. 2 is formed with a program storage area 302 and a data storage area 304. As previously described, the program storage area 302 is an area for reading and storing a part or a whole of program data that is set in advance in the flash memory 44 (FIG. 2).

A displaying state detection program 310 for detecting a displaying state of the display 14, a communication control program 312 for establishing the wireless communication, etc. are included in the program storage area 302. In addition, the program storage area 302 further includes programs for performing a telephone function, browser function, SNS function, etc.

The data storage area 304 of the RAM 46 is provided with a touch buffer 330, a displaying contents buffer 332 and a communication contents setting buffer 324. In addition, the data storage area 304 is stored with touch coordinates map data 336, GUI data 338, GUI coordinates data 340 and stand-by screen data 342. The data storage area 304 is further provided with a stand-by screen flag 344, a screen-off flag 346 and an active counter 348.

The touch buffer 330 is stored with touch coordinates data that is output from the touch panel control circuit 48. The displaying contents buffer 332 is temporarily stored with a message indicating the displaying contents of the screen, which the OS outputs. The communication contents setting buffer 334 is temporarily stored with information of an IP address indicating a communication destination, information indicating contents of the data that is received by the communication, etc.

The touch coordinates map data 336 is data for mapping touch coordinates of the touch operation and displaying coordinates of the display 14 with each other. That is, a result of the touch operation performed to the touch panel 16 is reflected in the displaying of the display 14 based on the touch coordinates map data 336.

The GUI data 338 includes image data and character string data for displaying the key(s), etc. that are to be displayed on the display 14. The GUI coordinates data 340 includes displaying coordinates data of the GUI that is being displayed. The stand-by screen data 342 is image data that is read when the stand-by screen is to be displayed.

The stand-by screen flag 344 is a flag for determining whether the displaying of the stand-by screen is notified. The stand-by screen flag 344 is constructed by a 1-bit register, for example. If the stand-by screen flag 344 is turned-on (true), a data value "1" is set in the register, and if the stand-by screen flag 344 is turned-off (false), a data value "0" is set in the register.

A screen-off flag 346 is a flag for determining whether the screen-off is notified. In addition, since structure of the screen-off flag 346 is approximately the same as that of the stand-by screen flag 344, a detailed description is omitted.

The active counter 348 is also called an active timer, and a count thereof is started when transiting to the active period. Then, if the active timer expires, the communication state is transited to the dormant state. In addition, as a value that the active counter 348 expires, a value corresponding to "$T_0$ seconds" (20 seconds, for example) is set. Then, when a state that the user operation is not performed is detected by the detecting module 70, the value that the active counter 348 expires is changed (shortened).

The data storage area 304 is stored with the image data that is displayed in the stand-by state, data of character strings, and provided with counters and flags necessary for operation of the mobile phone 10.

Figure 10:
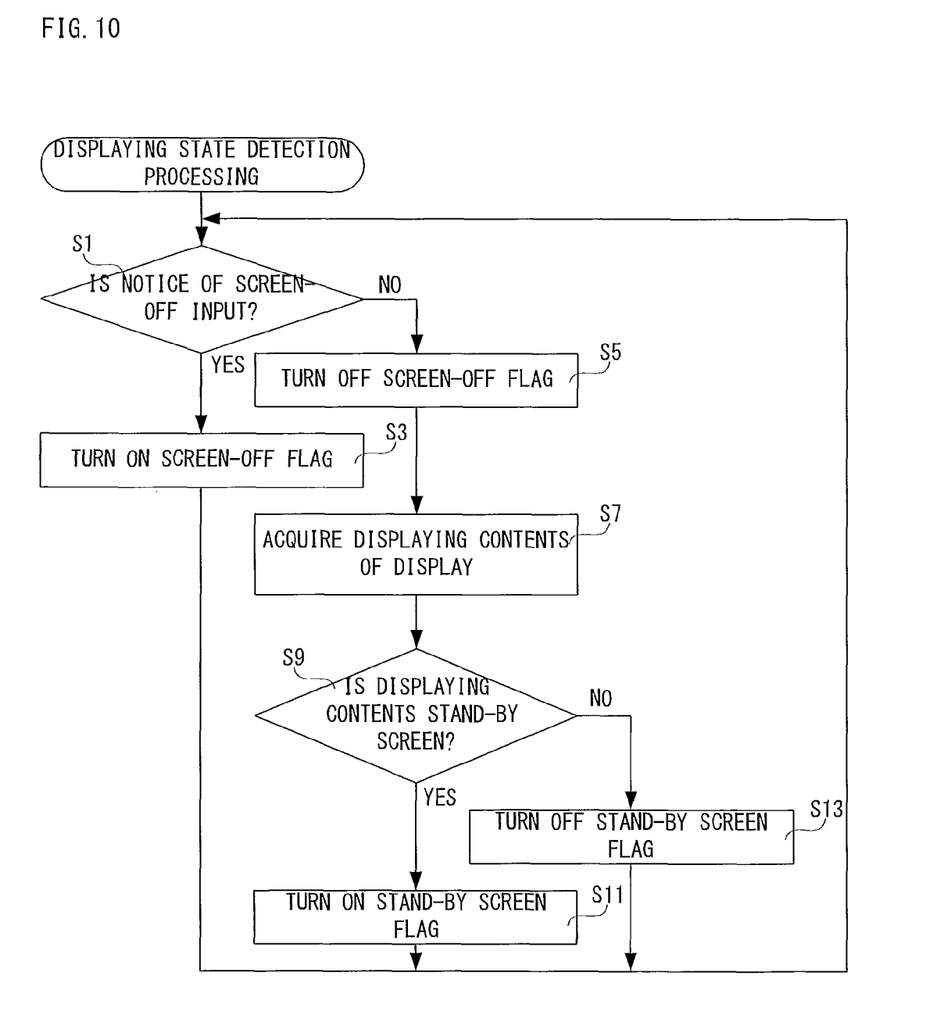
FIG. 10 is a flowchart showing an example of displaying state detection processing by a processor shown in FIG. 2.
Figure 11:
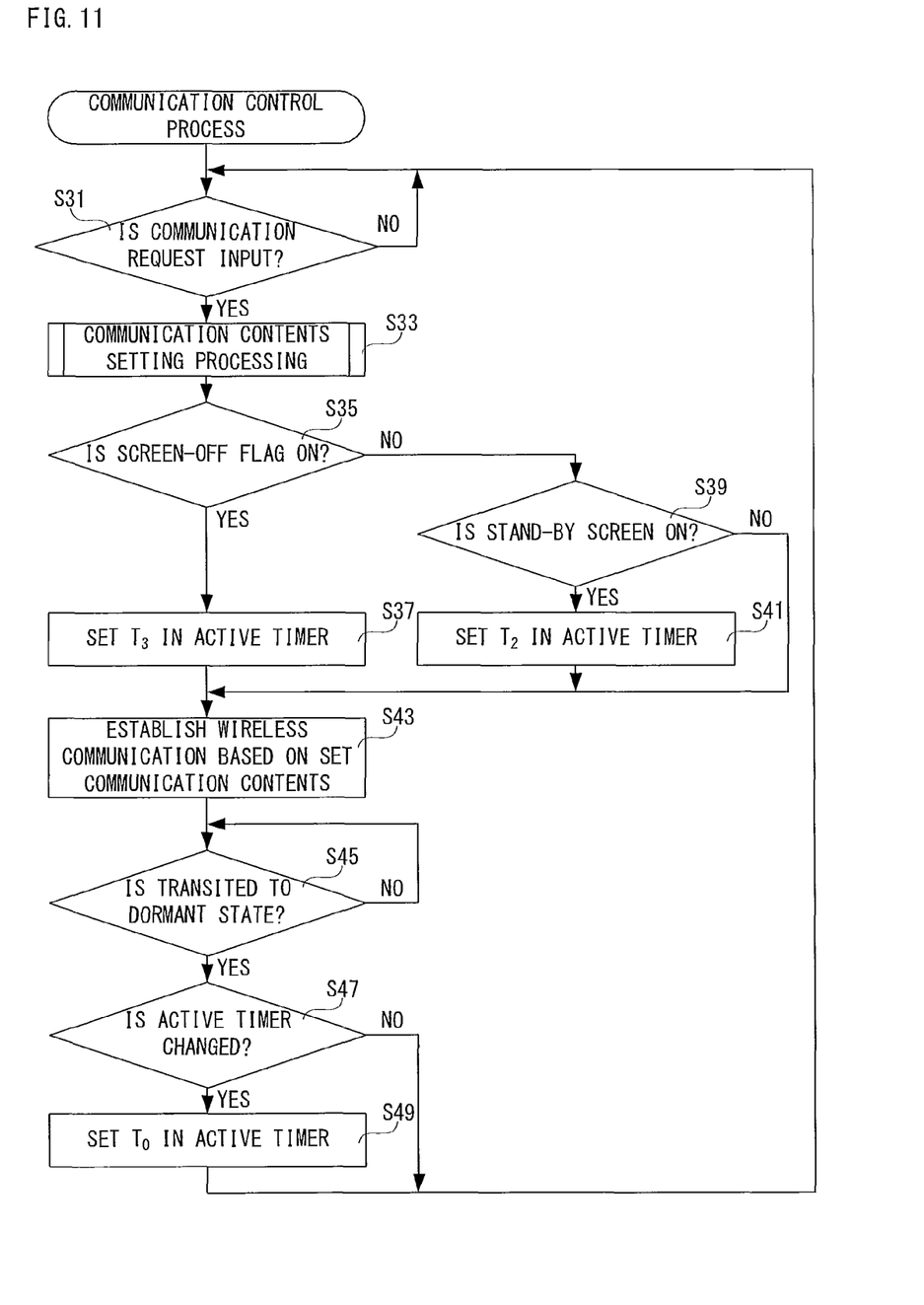
FIG. 11 is a flowchart showing an example of communication control processing by the processor shown in FIG. 2.

The processor 30 processes a plurality of tasks including displaying state detection processing shown in FIG. 10, communication control processing shown in FIG. 11, etc., in parallel with each other under controls of Linux (registered trademark)-base OS such as Android (registered trademark) and REX, or other OSs.

The displaying state detection processing is started if a power supply of the mobile phone 10 is turned on, for example. The processor 30 determines whether a notice of the screen-off is received at a step S1. That is, the processor 30 determines whether the screen-off of the display 14 is notified from the display driver 42. If "YES" in the step S1, that is, if the screen-off is notified, the processor 30 turns on the screen-off flag 346 in a step S3. Then, if processing of the step S3 is ended, the process returns to the step S1. On the other hand, if "NO" in the step S1, that is, if the screen-off is not notified, the processor 30 turns off the screen-off flag 346 in a step S5.

Subsequently, the processor 30 acquires the displaying contents of the display 14 in a step S7. That is, the processor 30 reads from the displaying contents buffer 332 a message that the OS outputs. Subsequently, the processor 30 determines in a step S9 whether the displaying contents are the stand-by screen. That is, the processor 30 determines whether the message that is read from the displaying contents buffer 332 is the contents indicating the stand-by screen. If "YES" in the step S9, that is, if the stand-by screen is displayed, the processor 30 turns on the stand-by screen flag 344 in a step S11, and then, the process returns to the step S1. On the other hand, if "NO" in the step S11, that is if a screen other than the stand-by screen is displayed, the processor 30 turns off the stand-by screen flag 344 in a step S13, and then, the process returns to the step S1.

In addition, if an operation turning off the power supply of the mobile phone 10 is performed, regardless of a position or phase of in the flowchart, the displaying state detection processing is terminated. In addition, the processor 30 that performs the processing of the steps S1, S7 and S9 functions as the detecting module 70. Especially, the processor 30 that performs the processing of step S1 functions as the first detecting module, and the processor 30 that performs the processing of steps S7 and S9 functions as the second detecting module.

FIG. 11 is a flowchart of communication control processing. For example, if the power supply of the mobile phone 10 is turned on, the processor 30 determines whether there is a communication request in a step S31. For example, the processor 30 determines whether there is a communication request from each of the functions 62-66 that is being performed. If "NO" in the step S31, the processor 30 repeatedly performs the processing of the step S31. On the other hand, if "YES" in the step S31, the processor 30 performs communication contents setting processing in a step S33. For example, the processor 30 stores in the communication contents setting buffer 334 the information such as an IP address, etc. contained in the communication request.

Subsequently, the processor 30 determines whether the screen-off flag 346 is turned on in a step S35. That is, the processor 30 determines whether the screen-off is notified. If "YES" in the step S35, that is, if the screen-off is notified, the processor 30 sets an active timer at "$T_3$" in a step S37. That is, a time period that the active timer expires is set as "$T_3$ seconds" (0 second, for example) by the forcing fast dormant instruction. In addition, if the processing of step S37 is ended, the process proceeds to a step S43.

On the other hand, if "NO" in the step S35, that is, if the screen-off of the display 14 is not notified, the processor 30 determines whether the stand-by screen flag 344 is turned on in a step S39. That is, the processor 30 determines whether the displaying of the stand-by screen is notified. If "YES" in the step S39, that is, if the displaying of the stand-by screen is notified, the processor 30 sets the active timer at "$T_2$" in a step S41. That is, a time period that the active timer expires is set as "$T_2$ seconds" (5 seconds, for example). Then, if the processing of the step S39 is ended, or if "NO" in the step S39, the process proceeds to a step S43.

In addition, the processor 30 that performs the processing of the steps S37 and S41 functions as a shortening module. Especially, the processor 30 that performs the processing of the step S37 functions as a first setting module, and the processor 30 that performs the processing of the step S41 functions as a second setting module.

The processor 30 establishes the wireless communication based on set-up communication contents in a step S43.

Based on the IP address stored in the communication contents setting buffer 334, the communication with the server, etc. that is connected with the network 102 is established. In addition, after the communication period is ended, the communication state is transited to the active period. If the time period that the active timer (active counter 348) expires is shortened at this time, the communication state is transited to the dormant state earlier than the usual. In addition, in a case where the forcing fast dormant instruction is issued, that is, if the active timer is set as "$T_3$ seconds", the communication state is transited to the dormant state without holding the active state.

Subsequently, in a step S45, the processor 30 determines whether the communication state is transited to the dormant state. That is, it is determined whether the wireless communication is disconnected. If "NO" in the step S45, that is, if not transited to the dormant state, the processor 30 repeatedly performs the processing of the step S45. On the other hand, if "YES" in the step S45, that is, if the communication state is transited to the dormant state, it is determined whether the active timer is changed in a step S47. That is, it is determined whether the time period that the active timer expires is "$T_0$ seconds." If "YES" in the step S47, that is, if the time period that the active timer expires is changed, the processor 30 sets the active timer at "$T_0$" in a step S49. That is, the time period that the active timer expires is set at "$T_0$ seconds" (20 seconds, for example). Then, if the processing of the step S49 is ended, or if "NO" in the step S47, the process returns to the step S31.

In addition, if an operation turning off the power supply of the mobile phone 10 is performed, regardless of a position or phase in the flowchart, the communication control processing is terminated.

In addition, a state that the mobile phone 10 is not operated may be detected based on the touch operation to the touch panel 16, and the key operation to the hardware keys 22-26. Furthermore, the display 14, the touch panel 16 and the hardware keys 22-26 may be collectively called an I/O interface.

In addition, although $T_0$, $T_1$ and $T_2$ of the above-mentioned embodiment satisfy a large/small relation of $T_0<T_2<T_1$, such a large/small relation can be arbitrarily and suitably changed, and any these two or three may be the same value. Furthermore, the value that is set in the active timer is not limited to the three above-mentioned kinds $T_0$, $T_1$ and $T_2$, and therefore, the number of the values may be increased suitably.

The programs used in the embodiments may be stored in an HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case where the programs downloaded via the above-described server or storage medium are installed to a mobile terminal having the structure equal to the structure of the embodiments, it is possible to obtain advantages equal to the advantages according to the embodiments.

The specific numerical values mentioned in this specification are only examples, and changeable appropriately in accordance with the change of product specifications.

It should be noted that reference numerals inside the parentheses and the supplements show one example of a corresponding relationship with the embodiments described above for easy understanding of the present invention, and do not limit the present invention.

An embodiment is a communication terminal comprising a communication circuit that performs wireless communication according to a system that the wireless communication is made dormancy temporarily, and an active state can be held after the wireless communication, comprising: a detecting module operable to detect a predetermined state; and a shortening module operable to shorten a time period of the active state when the predetermined state is detected.

In the embodiment, the communication terminal (10: reference numeral exemplifying a module corresponding in the embodiment, and so forth) includes the communication circuit (32) that performs wireless communication according to a system (dormant system) that the wireless communication is made dormancy temporarily, and the active state is held after the wireless communication. The detecting module (30, S1, S7, S9) detects a predetermined state based on a state of an I/O interface, for example. If the predetermined state is detected, the shortening module (30, S37, S41) shortens a time period of the active state by changing a setting of a timer, for example.

According to the embodiment, in a case where the wireless communication is performed when the communication terminal is not operated, by shortening the time period of the active state, it is possible to reduce current consumption without spoiling the physical feeling of the transmission speed in the user operation.

In another embodiment, the predetermined state includes a state not operated.

A further embodiment further comprises a display, wherein the detecting module includes a first detecting module operable to detect whether the display is turned off, and the shortening module includes a first setting module operable to set, when it is detected that the display is turned off, a first time period as a time period of the active state.

In the further embodiment, in a case where the display (14) is off, there is no user operation. Therefore, the first detecting module (30, S1) detects whether the display is turned off. The first setting module (30, S37) sets the first time period as the time period of the active state if it is detected that the display is turned off.

In a still further embodiment, the first time period is 0 second.

In the still further embodiment, the first setting module sets 0 second as the time period of the active state if it is detected that the display is turned off, thereby not to hold the active state.

According to the further embodiment and the still further embodiment, current consumption can be reduced by making the active state not to be held when the display is tuned off.

In a yet further embodiment, the detecting module further comprises a second detecting module operable to detect whether a stand-by screen is displayed on the display, wherein the shortening module further comprises a second setting module operable to set a second time period shorter than usual as the time period of the active state when it is detected that the stand-by screen is displayed on the display.

In the yet further embodiment, in a case where there is no user operation, the stand-by screen may be displayed on the display. Therefore, the second detecting module (30, S7, S9) detects whether the stand-by screen is displayed on the display. If the displaying of the stand-by screen is detected, the second setting module (30, S41) sets the second time period of a length of the usual half, for example, as a time that the active state is held.

According to the yet further embodiment, in a case where the stand-by screen is displayed on the display, the time period of the active state is shortened such that the current consumption is suppressed.

The other embodiment is a communication control method in a communication terminal (10) comprising a communication circuit (32) that performs wireless communication according to a system that the wireless communication is made dormancy temporarily, and an active state can be held after the wireless communication, comprising steps of: detecting (S1, S7, S9) a predetermined state; and shortening (S37, S41) a time of the active state when the predetermined state is detected.

According to the other embodiment, in a case where the wireless communication is performed when the communication terminal is not operated, by shortening the time period of the active state, it is possible to reduce the current consumption without spoiling the physical feeling of the transmission speed in the user operation.

Although the present invention has been described and illustrated in detail, it is clearly understood that the same is by way of illustrative and example only and is not to be taken by way of limitation, the spirit and scope of the present invention being limited only by the terms of the appended claim.

DESCRIPTION OF NUMERALS

10—mobile phone
14—display
16—touch panel
30—processor
40—input device
44—flash memory
46—RAM
48—touch-panel control circuit

The invention claimed is:

1. A communication terminal comprising:
a display;
a communication circuit that
performs wireless communication during a communication period,
remains in an active state, for an active time period, immediately following the communication period, and
transitions to a dormant state immediately following the active time period; and
at least one processor that
detects one of two or more predetermined states, wherein the two or more predetermined states comprise a first state, in which a functional screen for a function that utilizes data communication is displayed on the display, and a second state, in which a stand-by screen is displayed on the display,
when the first state, in which the functional screen is displayed, is detected, sets the active time period to a first time period, and,
when the second state, in which the stand-by screen is displayed, is detected, shortens the active time period of the active state to a second time period that is shorter than the first time period.

2. The communication terminal according to claim 1, wherein the two or more predetermined states comprise a third state in which the communication terminal is not operated, and wherein the at least one processor, when the third state, in which the communication terminal is not operated, is detected, shortens the active time period of the active state to a third time period that is shorter than the first time period.

3. The communication terminal according to claim 1, wherein the two or more predetermined states comprise a third state in which the display is turned off, and wherein the at least one processor, when the third state, in which the display is turned off, is detected, shortens the active time period of the active state to a third time period that is shorter than the first time period.

4. The communication terminal according to claim 3, wherein, when the third state is detected, the active time period of the active state is shortened to 0 seconds.

5. The communication terminal according to claim 1, wherein the at least one processor detects the one of the two or more predetermined states by acquiring display contents of the display.

6. A communication control method in a communication terminal comprising a communication circuit that performs wireless communication during a communication period, remains in an active state, for an active time period, immediately following the communication period, and transitions to a dormant state immediately following the active time period, the method comprising:
detecting one of two or more predetermined states, wherein the two or more predetermined states comprise a first state, in which a functional screen for a function that utilizes data communication is displayed, and a second state, in which a stand-by screen is displayed;
when the first state, in which the functional screen is displayed, is detected, setting the active time period to a first time period; and,
when the second state, in which the stand-by screen is displayed, is detected, shortening the active time period of the active state to a second time period that is shorter than the first time period.

7. The communication terminal according to claim 3, wherein, when the third state is detected, the active time period is shortened more than when the second state is detected.

8. The communication terminal according to claim 5, wherein acquiring display contents of the display comprises receiving a message from an operating system of the communication terminal.

9. The communication terminal according to claim 8, wherein the at least one processor receives the message from the operating system of the communication terminal via a display contents buffer.

10. A communication terminal comprising:
a communication circuit that performs wireless communication according to a system in which the wireless communication is made temporarily dormant and an active state can be held after the wireless communication; and
at least one processor configured to
detect a predetermined state,
shorten a time period holding the active state when the predetermined state is detected,
detect whether the display is turned on or off,
set a predetermined time period not including zero seconds as the time period holding the active state when it is detected that the display is turned on,
set a first time period being zero seconds as the time period holding the active state when it is detected that the display is turned off, and
set a second time period not including zero seconds and being shorter than the predetermined time period as the time period holding the active state if a standby screen is displayed on the display when it is detected that the display is turned on.

\* \* \* \* \*